H. J. HAIGH.
MULTIPLE BAKING PAN.
APPLICATION FILED SEPT. 15, 1917.

1,270,815.

Patented July 2, 1918.

Inventor
Harry J. Haigh
By his Attorneys
Criswell Davis

UNITED STATES PATENT OFFICE.

HARRY J. HAIGH, OF STAPLETON, NEW YORK.

MULTIPLE BAKING-PAN.

1,270,815.
Specification of Letters Patent.
Patented July 2, 1918.

Original application filed July 11, 1916, Serial No. 108,692. Divided and this application filed September 15, 1917. Serial No. 191,566.

*To all whom it may concern:*

Be it known that I, HARRY J. HAIGH, a citizen of the United States, and a resident of Stapleton, Staten Island, borough and county of Richmond, and State of New York, have invented certain new and useful Improvements in Multiple Baking-Pans, of which the following is a specification.

This invention relates to that class of baking pans known as multiple baking pans and employed in bakeries where it is desired, for convenience in handling, to rigidly connect together a plurality of individual pans. This application is a division of my copending application, Serial No. 108,692, filed July 11, 1916.

The principal object of the invention is to provide means for rigidly holding the side walls of adjacent pans spaced a fixed distance apart.

A further object of the invention is to provide a spacing device for the side walls of the pans so constructed and connected with the pans that the walls will be positively held against movement either toward or from each other thus insuring an even circulation of heat between the pans and also insuring uniform sizes of loaves.

A further object is to so construct the spacer and to so construct the same with the pans that the spacer will be rigidly secured to the pans and positively held against movement either vertically or horizontally, thus preventing disconnection or displacement of the spacers in handling the pans or during cleaning thereof by power-operated brushes.

Another object of the invention is to provide a simple connection between the spacer and adjacent pans whereby a spacer of relatively narrow width may be employed and securely held against dislodgment or movement along the side walls of the pans without the necessity of employing extraneous fastening devices, such as rivets or the like, extending through the pan walls.

Figure 1:
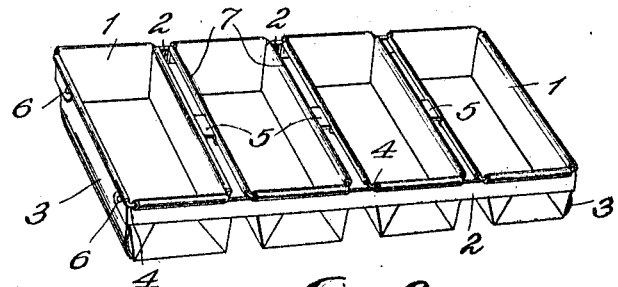
Figure 2:
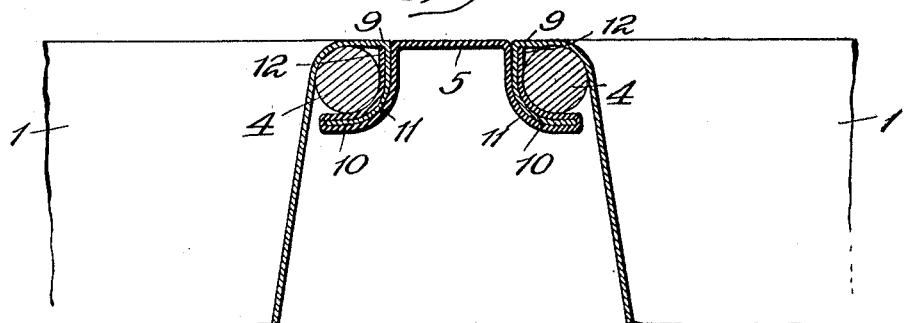
Figure 3:
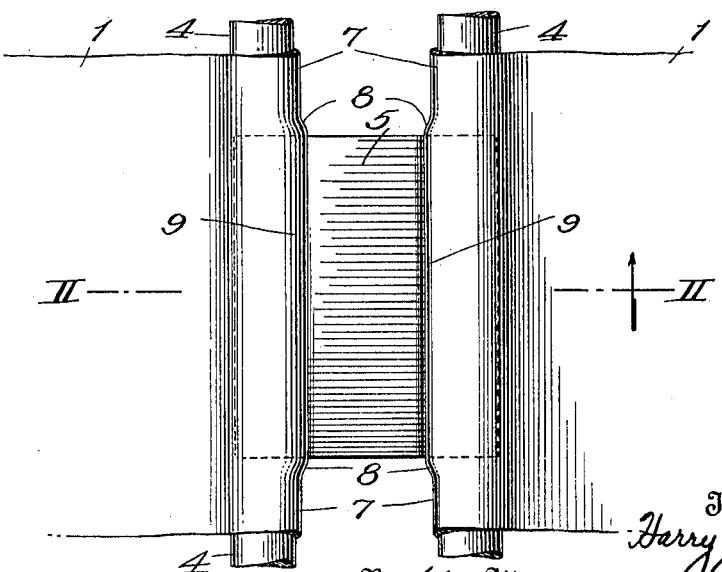

In the drawings, Figure 1 is a perspective view of one form of multiple baking pan provided with the improved spacing means;

Fig. 2 a vertical sectional view taken on the line II—II of Fig. 3, and showing one of the spacing devices, and parts of adjacent pans in vertical section; and Fig. 3 a fragmentary plan view showing one of the spacers and parts of two adjacent pans.

The multiple baking pan comprises a plurality of individual pans 1 each of which is provided with a rectangular wire reinforcing frame 4 extending around the upper edge thereof. The upper edges 7 of the side walls of the pans 1 are bent downwardly and inwardly around the side members of the wire frames 4. The ends of the pans 1 are connected to a pair of bars 2 by means of suitable spaced lugs formed on the upper edges of said bars and bent outwardly and downwardly about the end members of the wire frames 4. The upper edges of the end walls of the pans 1 are bent outwardly and downwardly around the end members of the frames 4 over said lugs. The outer sides of the two end pans 1 are protected by suitable buffer plates 3 secured to the inwardly bent ends of the bars 2 by rivets 6.

Interposed between the adjacent side-walls of the pans 1 are spacing devices 5. The spacers 5 are narrow in width and one of said spacers is interposed between the adjacent side walls of each two pans substantially midway the length of the pans. Each spacer is formed with a flat horizontally disposed central portion 5, extending between the pans parallel with the upper edge thereof, and with oppositely facing, downwardly and outwardly curved portions 11 extending from the horizontal portion 5 to a point below the adjacent side members of the wire frames 4 of the pans.

Offset portions 9 of the upper edges of the side walls of the pans extend outwardly to the edges of the flat portion 5 of the spacer and are then bent downwardly and inwardly at 10 alongside the curved portions 11 of the spacer to a point below the frame members 4, and lie between said downwardly and outwardly curved portions 11 and the portions 12 of the spacer. The portions 12 of the spacer are bent back upon the portions 11 and the portions 10 of the side walls of the pans and extend outwardly and upwardly between the offset parts 10 of the pan walls and the frame members 4 from a point below said members to a point at the outer side thereof, preferably substantially parallel with the under side of the part 5 of the spacer below the horizontally extending offset portions 9 of the pan wall.

The upper edges 7 of the pan walls at each side of the offset parts 9 and 10 thereof are bent tightly around the wire frames 4 and form shoulders 8 at each edge of the parts 12 of the spacers, thus preventing the spacers from shifting laterally along the side walls of the pans.

It will be observed that the part 5 and the parts 11 effectually prevent movement of the pan walls toward each other while the parts 12 clamped between the pan edges and the frames 4 positively hold the pan walls against movement away from each other. It will also be seen that the parts 12 prevent downward movement of the spacer and the parts 11 prevent upward movement thereof.

Another important feature of the invention consists in confining the parts 12 between the shoulders 8 formed by the offset portions 9 and 10 of the pan walls, whereby the spacer is securely and positively held against lateral movement along the side walls of the pans.

It will also be observed that the flat portion 5 of the spacer is flush with the top of the pan and parallel with the offset portions 9 of the pan walls, and that the parts 5 and 9 abut closely together, thus leaving no crevice in which dirt, dough, etc., might accumulate between the spacer and the edges of the pans.

What I claim is:

1. A multiple baking pan comprising a plurality of spaced pans each having a reinforcing wire extending around the upper edge thereof, connecting bars secured to the ends of the pans, and spacing members between the side walls of adjacent pans formed with a horizontally extending spacing portion and depending end portions, each of said end portions being curved outwardly and downwardly from said flat spacing portion and doubled back upon itself from a point opposite the under side of the adjacent reinforcing wire to a point opposite the outer side of said wire, portions of the upper edges of the side walls of the pans extending downwardly and inwardly between the doubled and curved end portions of the spacing members from points above the adjacent reinforcing wires to points below said wires.

2. A pan spacing device comprising a flat metal plate of relatively narrow width the end portions of which are doubled back upon themselves in spaced relation and bent downwardly and outwardly from opposite sides of a flat intermediate portion of single thickness to form downwardly and outwardly curved pockets, the open upper ends of which are substantially flush with said flat intermediate portion of the device.

3. The combination of a plurality of spaced pans each having a reinforcing wire extending around the upper edge thereof, the upper edges of the side walls of the pans being bent downwardly and inwardly about said wires to points below the under side thereof, connecting bars secured to the ends of the pans, and means for positively holding the adjacent side walls of the pans from movement toward or from each other embodying a relatively narrow sheet metal member interposed between each two pans intermediate the ends of the side walls thereof having a substantially horizontal central portion extending between the pan walls and downwardly and outwardly curved end portions doubled upon themselves throughout their length, the two thicknesses of the doubled end portions being spaced apart to receive offset portions of the downwardly and inwardly bent edges of the side walls of the pan therebetween.

4. The combination of two pans arranged side by side in spaced relation, a reinforcing wire extending about the upper edge of each pan, the upper edges of the side walls of the pans being bent downwardly and inwardly around said wires from points above the wires to points below the same, and a relatively narrow plate-like spacing member extending across the space between the adjacent side walls of the pans substantially midway the length of the pan walls, said member having end portions each of which is doubled upon itself and bent to form a downwardly and outwardly curved pocket extending from a point at one side of the adjacent wire to a point below said wire, a portion of the downwardly and inwardly bent upper edges of the adjacent side walls of the pans being off-set from the wires and lying between the doubled and curved end portions of the spacing member.

This specification signed this 13th day of September, A. D. 1917.

HARRY J. HAIGH.

Copies of this patent may be obtained for five cents each, by addressing the "Commissioner of Patents, Washington, D. C."